United States Patent [19]

Weiss et al.

[11] 4,071,809
[45] Jan. 31, 1978

[54] APPARATUS FOR SYNTHESIZING OF COLORS

[76] Inventors: Jean Michel Weiss, 50, rue Sebastien Mercier, 75015 Paris, France; Pierre-Regis Marie Irrissou, 2, rue Albert de Mun, Meudon, France, 92190

[21] Appl. No.: 631,457

[22] Filed: Nov. 13, 1975

[30] Foreign Application Priority Data

Nov. 18, 1974 France .................. 74 37977

[51] Int. Cl.² ...................... H05B 41/34; H05B 41/44
[52] U.S. Cl. .................. 315/312; 315/241 R; 315/245; 315/293; 315/314; 315/324; 362/231
[58] Field of Search .............. 315/241 R, 245, 291, 315/292, 293, 312, 313, 314, 315, 316, 317, 324, DIG. 4; 240/3.1

[56] References Cited

U.S. PATENT DOCUMENTS

| 1,891,216 | 12/1932 | Hough | 315/313 X |
|---|---|---|---|
| 2,041,458 | 5/1936 | Cooper | 315/313 X |
| 2,591,650 | 4/1952 | Williams | 315/292 |
| 3,093,319 | 6/1963 | Gamain | 240/3.1 X |
| 3,143,300 | 8/1964 | Way | 315/317 X |
| 3,638,070 | 1/1972 | Powell | 315/DIG. 4 |
| 3,760,174 | 9/1973 | Boenning et al. | 240/3.1 X |
| 3,796,916 | 3/1974 | DeBelder et al. | 315/312 X |

Primary Examiner—Eugene R. LaRoche
Attorney, Agent, or Firm—Weingarten, Maxham & Schurgin

[57] ABSTRACT

A synthesizer using the additive method of color synthesis and having a plurality of different color filters to provide corresponding primary color radiations which are combined to produce a tone having a specified color content. The filters are illuminated by either one or a plurality of gas discharge lamps equal in number to the number of color filters, the frequency and duration of the flashes from the lamp incident on each filter being determined by a control circuit to produce a predetermined luminous intensity for each primary color. The circuit may be programmed by specifying numerical values for the required luminous intensity of each primary color and the circuit adapted to control the frequency and duration of the flashes in accordance with the specified numerical values.

11 Claims, 5 Drawing Figures

APPARATUS FOR SYNTHESIZING OF COLORS

FIELD OF THE INVENTION

The present invention relates to apparatus for synthesizing colours which uses the additive method of colour synthesis thus making it possible to obtain a wide range of different colours.

Apparatus of this kind may have numerous applications as a source of reference colours which can be used in the field of printing on paper, fabrics, or photosensitive material, or as a source of projection of variable coloured light which can be used for multichrome image selection or for obtaining special effects in the lighting of stationary or moving images, or as a source of light for the grading of cinematographic films.

BRIEF REVIEW OF PRIOR ART

Known devices for synthesizing colours which operate on the basis of the additive method of primary colour synthesis generally comprise at least one lighting source and a plurality of colour filters, means for varying the luminous intensity of each of the colours, and an optical system for imparting to the different radiations of primary colours a common emergence direction. These radiations may be derived from a lamp whose light is divided into a plurality of paths of different colours, for example with the aid of dichroic mirrors, or else from a plurality of lamps, each of which is associated with a filter of a different colour. The variation of the luminous intensity of each of the primary colours is generally controlled by means of diaphragms interposed in the various paths of the different coloured radiations. The utilisation of diaphragms, even if they are motorised, does not make it possible to effect very rapid modifications to the luminous intensity, particularly large modifications. Furthermore, the need to provide a number of diaphragms and diaphragm control means corresponding to the number of primary colours which can be used makes the known devices complex and expensive.

It has also been proposed using colour or black and white C.R.T. screens and interposing filters and modifying the video chrominance and luminance signals to obtain a wide variety of colours. Apart from its cost, an apparatus of this kind has the disadvantage of supplying a half-tone image which prevents its subsequent utilisation in photography.

SUMMARY OF THE INVENTION

The present invention seeks to obviate the disadvantages mentioned above by providing apparatus which avoids the use of diaphragms and enables rapid variations of the luminous intensity of the primary colours available to be achieved by means of simple controls.

This is achieved in an apparatus according to the invention by using a discharge lamp as the light source and controlling the intensity of the light produced each time the lamp is triggered.

Unlike continuous emission sources, discharge lamps have a colour temperature which remain substantially constant when their intensity of illumination is varied. Thus in apparatus in accordance with the invention the luminous intensity of a primary colour can be varied almost instantaneously by controlling the amount of energy supplied to the lamp to alter its intensity of illumination thus avoiding the use of diaphragms.

The intensity of illumination produced by a discharge lamp depends on the frequency and the duration of the flashes, and therefore can be varied by controlling one or more of these parameters. The choice of parameter depends on the nature of the source used and on the degree of complexity of the circuit used to control the chosen parameter. It is, for example, possible to control the flash frequency of lamps used in stroboscopy whose discharge is effected by voltage pulses applied to a control electrode. It is also possible to control the value of a charging voltage applied to a capacitor connected to the lamp and store the energy which is used subsequently to trigger the lamp.

The luminous intensity of each elementary colour can be varied continuously or in a discrete manner. In particular the luminous intensity can be quantified, and if $n$ primary colours are available and if for each of them there are $p$ different levels of intensity, it will be possible to obtain a number of combinations equal to $p^n$, that is to say a very wide range of different identifiable tones which can advantageously be coded in a numerical form indicating, for each tone, the values of the intensity levels for each primary colour. Finally, the intensity control circuits associated with the lamp can be designed to be controlled, by coded information recorded on an information carrier such as perforated bands, tapes, or card, magnetic tape, or disc in accordance with a predetermined programme.

DESCRIPTION OF THE PREFERRED EMBODIMENTS

Figure 1:
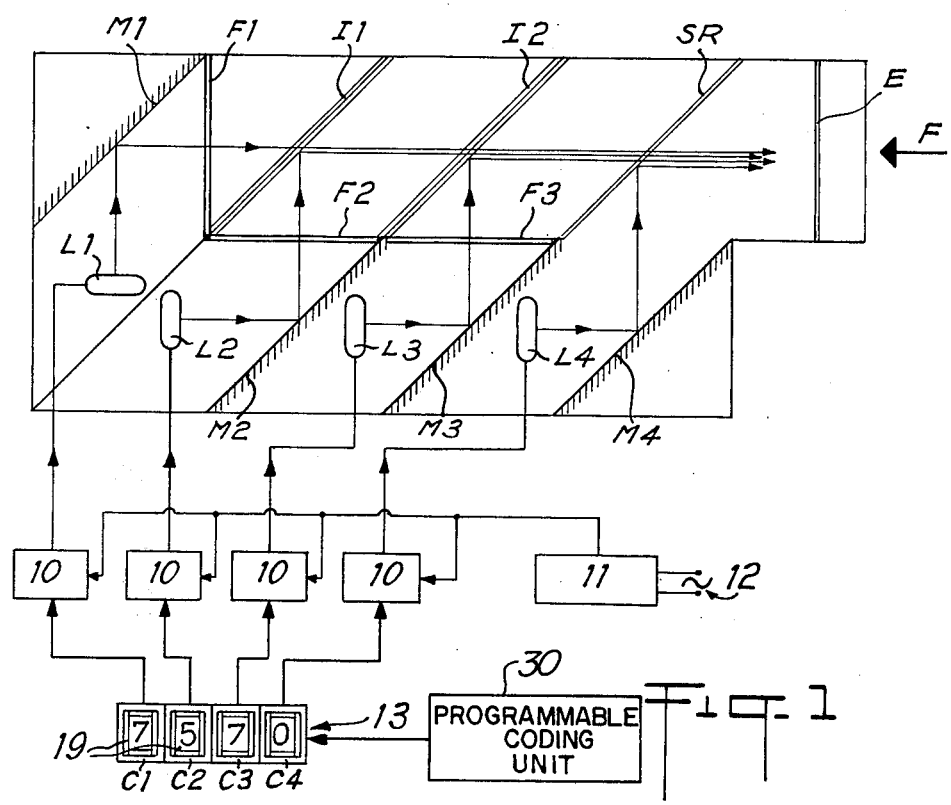
FIG. 1 is a diagrammatic view of apparatus according to the invention.

The apparatus illustrated in FIG. 1 provides three primary colours and comprises four gas discharge lamps L1, L2, L3, and L4. Each lamp is an xenon lamp which has an emission spectrum similar to that of daylight. The light which is emitted by the lamp L1 is reflected by a mirror M1 and passes through a green filter F1. Similarly, the lamp L2 is associated with a mirror M2 and a red filter F2, and the lamp L3 is associated with a mirror M3 and a blue filter F3. Finally, the lamp L4 is simply associated with a mirror M4. The lamps L1, L2 and L3, therefore supply respectively, the primary components green, red and blue, and the lamp L4 white. Two dichroic mirrors I1 and I2 and a semi-reflecting surface SR are disposed in succession and inclined at 45° to the path of the green radiation, the mirror $I_1$ transmitting green and reflecting red, while the mirror, I2 transmits red and green and reflects blue. The red radiation is reflected by the mirror $I_1$, its angle of incidence on this mirror being equal to 45°, and then follows a path identical to the green radiation through the mirror I2 and the semi-reflecting surface SR. The blue radiation is reflected by the mirror I2, its angle of incidence on this mirror being equal to 45°, and then follows a path identical to that of the green and red radiations through the semi-reflecting surface SR. Finally, the white radiation is reflected by the surface SR and then follows a path identical to that of the other three radiations. It will be noted that the association of a coloured filter and a dichroic mirror for each coloured radiation makes it possible to obtain saturated, purified green, red, and blue colours.

Downstream of the surface SR is disposed a screen E, which is, for example, covered by a thin coating of a black deposit intended to absorb radiations outside the apparatus but to transmit to a large extent the combined radiations from the lamps. By observing the screen E in the direction of the arrow F it is possible to perceive the tones obtained by additive synthesis of the various radiations of primary colours. The provision of an optical system, comprising for example a condenser, in place of the screen E makes it possible for the synthesized radiations to be projected.

The intensity of illumination of each lamp can be varied by means of an intensity control circuit 10 associated with the respective lamp.

A voltage source 11 supplies to each circuit 10 the energy required to trigger the lamp. The source 11 may simply consist of a circuit for rectifying the alternating voltage of a mains supply 12. The intensity control circuits 10 are identical and are controlled from a control unit 13 comprising four control elements C1, C2, C3, and C4 respectively for controlling the intensity of illumination of the lamps L1, L2, L3, and L4.

Figure 2:
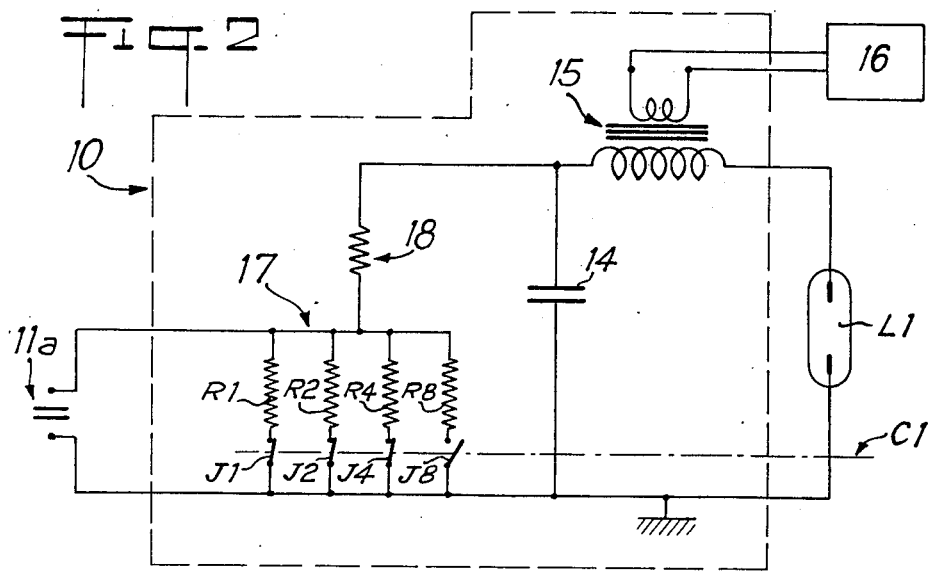
FIG. 2 shows an intensity control circuit for a discharge lamp.

FIG. 2 illustrates a form of construction of an intensity control circuit 10 for each lamp. This circuit comprises a capacitor 14 connected to the terminals of the lamp L1 and a transformer 15 controlling the discharge in the lamp. The primary of the transformer 15 is connected to a trigger circuit 16, which may be common to all the circuits 10 and which determines the flash frequency. Preferably the lamp flashes are synchronized and the variation in intensity of illumination of the lamps is obtained by varying the applied voltage. Thus all the flashes produced by the lamps will be synchronized and will have the same duration, so that the known phenomenon of colour fringing on a moving subject is avoided. The intensity of illumination of each lamp is dependent on the voltage across the capacitor 14, and this voltage can be varied by means of a voltage divider 17 connected in parallel with output 11a of the voltage source 11, the capacitor 14 being connected in parallel with the series circuit formed by the voltage divider 17 and a charging resistor 18. The voltage divider 17 comprises a plurality of resistors R1, R2, R4, and R8, each being connected to a different one of the switch circuits represented diagrammatically by J1, J2, J4 and J8 respectively. The set of resistors R1, R2, R4 and R8 and switches J1, J2, J4, and J8 forms a programmable voltage divider enabling the capacitor 14 to be charged to different quantified voltage levels under the control of the control unit C1, which may be either a numbered coding wheel such as 19 (FIG. 1) or a keyboard with numbered keys. Thus setting the coding wheel on the control unit C1 to the numeral "7" causes the switches J1, J2, and J4 to close thereby charging the capacitor 14 to a voltage level "7," which triggers the lamp L1 to provide a flash having a luminous intensity of a level "7." If, for example, 10 intensity levels (the level "0" being included) are provided on each of the control units C1, C2, C3, and C4, it is possible to obtain 9999 different, reproducible tones, and each of these tones can be identified by a four-figure number, these numbers indicating the respective levels of intensity of green, red, blue, and white making up a tone.

The charging voltage of the capacitor 14 varies between a minimum value $U_o$, below which the operation of the lamp L1 is not stable, and a maximum value $U_1$ beyond which self-ignition of the lamp L1 occurs. The power available is then equal to $(U_1/U_o)^2$ and may attain a value higher than 40.

The ability to represent colours in numerical form is particularly advantageous in defining a tone and in analysing and identifying a particular tone by recomposing the colours from which the tone is made up by successive approximations of the colours comprising that tone upon the screen E.

The utilization of a programmable voltage divider 17 controlled by binary coded words makes it possible for the intensity control circuit 10 to be controlled, not manually, but by means of a logic circuit which receives coded information in binary form. This information may be stored on a carrier, such as a perforated tape, or card, or a magnetic tape, or disc. Such a device is represented by programmable coding unit 30 in FIG. 1. A similar device may be employed with any of the embodiments of this invention. The apparatus can then be used to project light whose colour content can be varied very quickly, within a period of time separating two successive flashes, for example one hundredth of a second.

Alternatively the variation in luminous intensity of each primary colour can be effected continuously by replacing the programmable voltage divider 17 by potentiometers which can be adjusted by the control units C1, C2, C3, and C4.

Figure 3:
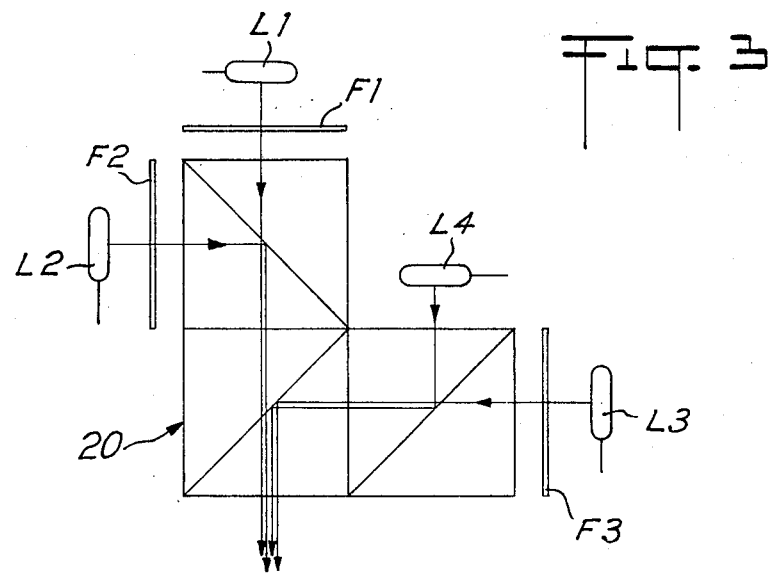
FIG. 3 is a diagrammatic view of a modification to part of the apparatus shown in FIG. 1.

Likewise it is possible to replace the assembly comprising the mirrors M1, M2, M3, and M4, the dichroic mirrors I1 and I2, and the semi-reflecting surface SR by an optical unit such as 20 (FIG. 3) composed of prisms in order to provide a common path for the different primary colours. Furthermore, it is possible to use less or more than three primary colours. Finally, means are preferably provided, to prevent overheating of the gas discharge lamps by ventilating the area around the lamp or lamps.

Figure 4:
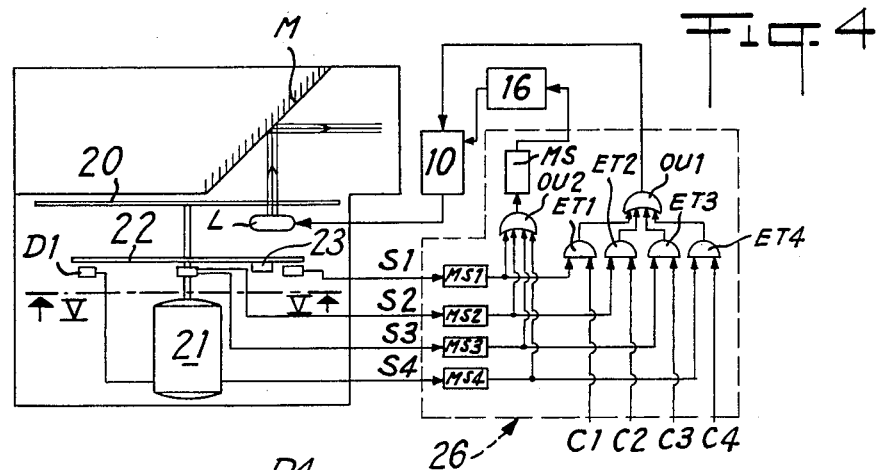
FIG. 4 shows a second form of apparatus according to the invention.
Figure 5:
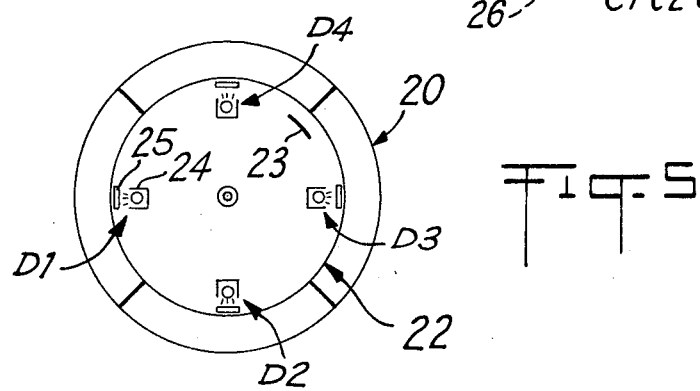
FIG. 5 is a sectional view on the line V—V in FIG. 4.

FIGS. 4 and 5 illustrate a second form of construction of apparatus according to the invention. The elements common to the arrangement illustrated in FIGS. 1 and 4 bear the same references.

This second embodiment differs from that previously described in that each of the primary colours is provided by a single lamp L associated with a rotating support, such as a disc 20 carrying different colour filters.

The disc 20 rotates in a horizontal plane between a gas discharge lamp L and a mirror M reflecting the radiation emitted by the lamp to the outlet of the apparatus. The disc 20 is divided into equal sectors $20_1$, $20_2$, $20_3$, $20_4$ each being a filter of a different colour. In the example illustrated the number of filters is equal to four, but this number could be different, although in general it is equal to at least three. The disc 20 is driven by a synchronous motor 21 rotating at 1500 rpm.

Synchronisation between the flashes provided by the lamp L, the rotation of the different colour filters in front of the lamp, and control of the intensity of illumination for each colour is effected in the following manner.

On a disc 22 which is fixed to the disc 20, a reference mark 23 is provided which on the rotation of the disc 20 passes in front of four detectors D1, D2, D3, and D4. The reference mark 23 and the detectors D1 to D4 are so disposed that the latter emit signals S1, S2, S3, and S4 respectively when a colour filter carried by the disc 20 is interposed between the lamp L and the mirror M. Each particular filter is thus associated with a different one of each of the signals S1 to S4.

In the example illustrated the detectors D1 to D4 are detectors of the photoelectric type, each of them comprising a light source 24 and a photoelectric device 25. The reference mark 23 acts as a mask which on rotation of the disc 20 passes between the sources 24 and the associated devices 25. Instead of using photoelectric devices it is possible to utilise magnetic detectors, for example, Hall effect detectors, the reference mark 23 being a piece of ferromagnetic metal.

The signals S1 to S4 are applied to the input of a multiplexing circuit 26, which is connected to the outputs of the control units C1 to C4. In response to the appearance at its input of one of the signals S1 to S4, the multiplexing circuit 26 connects the output of the corresponding control unit to the input of the intensity control circuit 10 of the lamp L, and transmits a control pulse to the input of the trigger circuit 16 connected to the circuit 10.

The multiplexing circuit 26 contains monostable multivibrators MS1 to MS4, which convert the signals S1 to S4 into pulses of predetermined duration, which are applied to the first inputs of "AND" gates ET1 to ET4. The gates ET1 to ET4 receive at their second inputs the output signals of the control units C1 to C4, and their outputs are connected to the inputs of an "OR" gate OU1, whose output is connected to the input of the circuit 10. The intensity of illumination provided by the lamp when each filter passes in front of it is therefore controlled by adjusting the circuit 10 in accordance with the instructions supplied by the control units C1 to C4 in response to the signals S1 to S4.

The triggering of the lamp L is controlled by the circuit 16 after each adjustment of intensity. For this purpose the pulses supplied by the multivibrators MS1 to MS4 are applied to the input of a multivibrator MS by way of an OR gate OU2. The multivibrator MS supplies a triggering control signal to the circuit 16 in response to the trailing edges of the pulses supplied by the multivibrators MS1 to MS4.

As already indicated, apparatus according to the invention can also be used as a source of reference colours, since a numerical code defines each colour produced. With the aid of this apparatus it is therefore possible for any colour to be reproduced easily and faithfully if its code number is known.

Furthermore, in the example illustrated the code number displayed in the control units C1 to C4 corresponds to a tone obtained by additive synthesis. It is possible to use a subtractive synthesis code instead of or together with the additive synthesis code by an operation which can be effected automatically by a computer circuit connected to the control units, thus making it possible for the additive synthesis code and the subtractive synthesis code to be displayed simultaneously for each colour.

What is claimed is:

1. A colour synthesizer comprising:
   a discharge lamp source;
   a plurality of colour filters;
   means mounting said filters relative to said source to produce radiation in each of a predetermined number of primary colours along a common path, said mounting means comprising:
   a movable support carrying said plurality of colour filters;
   means rotating said support to pass said colour filters in succession in front of said lamp;
   a trigger circuit for said lamp; and
   a synchronization circuit responsive to the rotation of said support connected to said trigger circuit to control the discharge of said lamp; and
   means for varying the luminous intensity of said source thereby varying the luminous intensity of the primary colour radiation from said filters.

2. A colour synthesizer according to claim 1, wherein said support has a reference mark and said synthesizer further includes an assembly of four detectors, each detector on detecting the passage of the said reference mark supplying to said synchronisation circuit a signal representing the relative position of a predetermined filter in relation to the said lamp.

3. The colour synthesizer recited in claim 1 wherein said luminous intensity varying means comprises:
   a control circuit for supplying energy to said lamp source; and
   a plurality of presettable control units each associated with a respective primary colour and including means for altering the amount of energy supplied to said lamp source by said control circuit;
   whereby a colour may be synthesized by combining radiations in a plurality of said primary colours each with a luminous intensity having a value obtained by presetting of the respective control unit.

4. The colour synthesizer recited in claim 3 wherein:
   said movable support carries a reference mark; and
   said synthesizer further includes an assembly of detectors, each detector being responsive to the passage of said reference mark to supply to said synchronization circuit a signal indicating that a given colour filter has reached a predetermined position relative to said lamp source.

5. The colour synthesizer recited in claim 3 wherein each of said control units comprises means for discretely modifying the amount of energy supplied to said lamp source by said control circuit whereby the value of the luminous intensity of the radiation in each of the primary colours may be independently selected from a given number of predetermined values upon presetting of the respective control unit.

6. The colour synthesizer recited in claim 5 wherein said control circuit comprises a programmable voltage divider.

7. The colour synthesizer recited in claim 5 wherein each of said control units comprises actuable control means and means for indicating the luminous intensity value selected through actuation of said actuable control means.

8. A colour synthesizer comprising:
   a discharge lamp source;
   a plurality of colour filters;
   means mounting said filters relative to said lamp source to produce radiation in each of a predetermined number of primary colours along a common path; and
   means for selectively and discretely varying the luminous intensity of each of the primary colour radiations, said intensity varying means comprising:
   a control circuit for supplying energy to said lamp source; and a plurality of independently presettable control units each associated with a respective primary colour and comprising means for discretely altering the amount of energy supplied to said source by said control circuit to assume one of a predetermined number of quantified values;

whereby a colour may be synthesized by combining radiations in a plurality of said primary colours each with a luminous intensity having a value independently selected from a given number of predetermined values upon presetting of the respective control unit.

9. The colour synthesizer recited in claim 8 wherein said lamp source comprises a plurality of gas discharge lamps, the number of which is equal to the number of primary colours, each said lamp being associated with respective control circuit and control unit, said mounting means locating each of said filters in front of a different one of said lamps and comprising optical elements for causing the radiations produced by said lamps to have a common emergence direction.

10. The synthesizer recited in claim 8 wherein each of said control units comprises:

actuable control means; and means for indicating the luminous intensity value preselected through actuation of said actuable control means.

11. The colour synthesizer recited in claim 10 wherein said control circuit comprises a programmable non-continuous voltage divider.

* * * * *